(12) United States Patent
Kumar et al.

(10) Patent No.: US 10,924,275 B1
(45) Date of Patent: Feb. 16, 2021

(54) CREATING MULTIPLE ENCRYPTED VOLUMES FROM A SINGLE SOURCE

(71) Applicant: Amazon Technologies, Inc., Seattle, WA (US)

(72) Inventors: Sandeep Kumar, Sammamish, WA (US); Arvind Chandrasekar, Seattle, WA (US); Lalit Jain, Seattle, WA (US); James Pinkerton, Sammamish, WA (US); Marc Stephen Olson, Bellevue, WA (US); Danny Wei, Seattle, WA (US); Sriram Venugopal, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 16/147,000

(22) Filed: Sep. 28, 2018

(51) Int. Cl.
*H04L 29/06* (2006.01)
*H04L 9/16* (2006.01)
*H04L 9/08* (2006.01)

(52) U.S. Cl.
CPC .............. *H04L 9/16* (2013.01); *H04L 9/0894* (2013.01); *H04L 63/0428* (2013.01)

(58) Field of Classification Search
None
See application file for complete search history.

(56) References Cited

U.S. PATENT DOCUMENTS

| 2014/0003600 A1* | 1/2014 | Cooke | H04L 9/0618 380/28 |
| 2014/0223194 A1* | 8/2014 | Cooke | G06F 21/602 713/189 |
| 2015/0134962 A1* | 5/2015 | Mahajan | H04L 63/061 713/171 |

* cited by examiner

*Primary Examiner* — Andrew J Steinle
(74) *Attorney, Agent, or Firm* — Knobbe, Martens, Olson & Bear, LLP

(57) ABSTRACT

Generally described, one or more aspects of the present application correspond to techniques for creating multiple encrypted block store volumes of data from an unencrypted source. These encryption techniques can use a transform fleet as an intermediary use between the unencrypted source and the encrypted volumes. The transform fleet can obtain data of the volume from one or both of two sources—an object storage "snapshot" a block storage "source volume"—and can then apply the appropriate encryption key for performing the encryption of a particular volume.

20 Claims, 7 Drawing Sheets

US 10,924,275 B1

CREATING MULTIPLE ENCRYPTED VOLUMES FROM A SINGLE SOURCE

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively infrastructure of on-premises computing environments, requires a system architecture that can reliably re-allocate its hardware according to the changing needs of its user base.

DETAILED DESCRIPTION

Figure 1A:
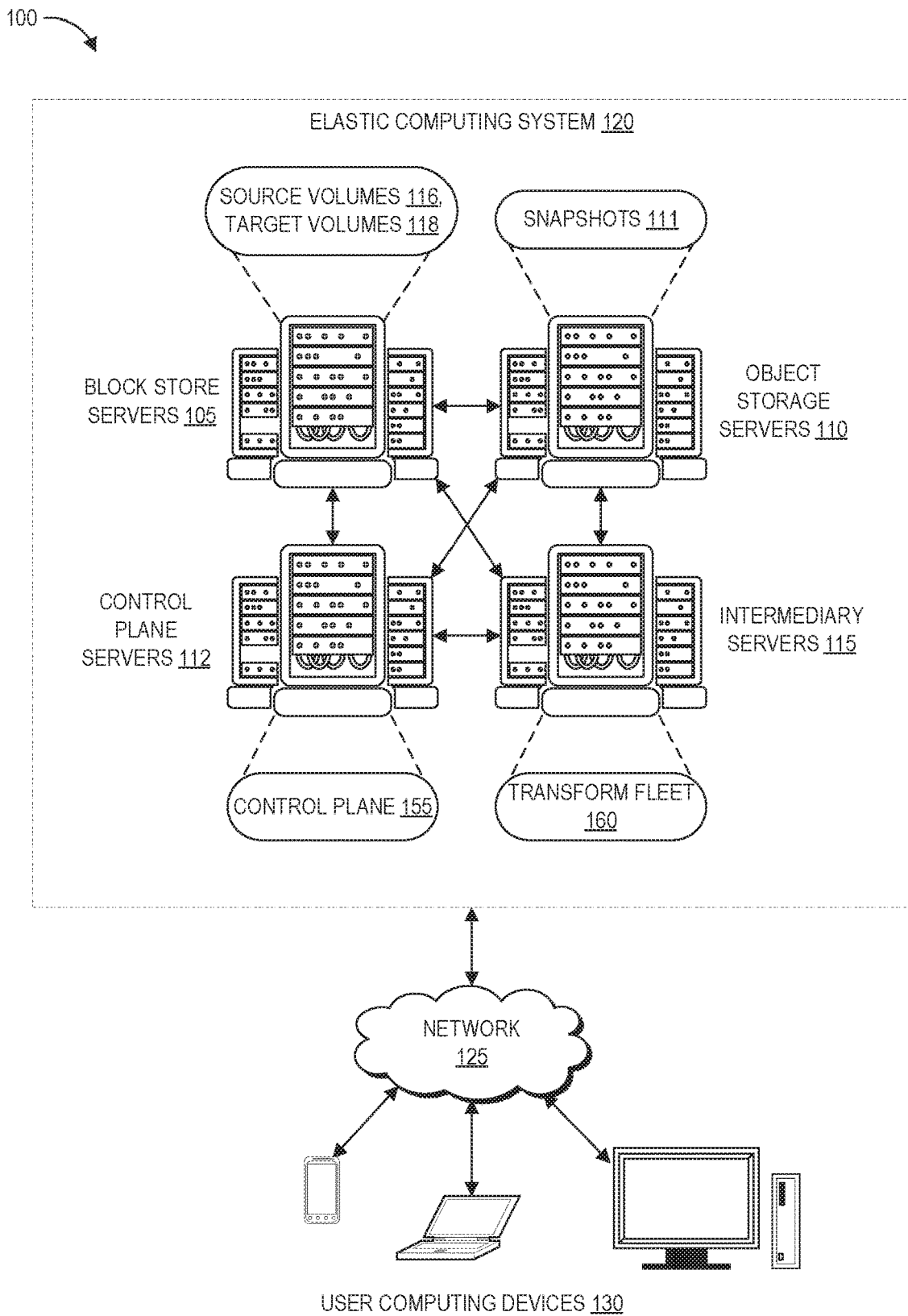
FIG. 1A depicts a schematic diagram of an elastic computing system in which various embodiments according to the present disclosure can be implemented.

Generally described, the present disclosure relates to creating multiple encrypted block store volumes of data from the same unencrypted block store volume, with that block store volume having been copied from an unencrypted object storage snapshot of an origin volume. Users may not initially request encryption of their volumes, which can result in any backup copies (some of which are referred to herein as "snapshots") also not being encrypted. These backup copies can be used to create new copies of the volume, which similarly would not be encrypted. For example, the servers hosting the object storage snapshot may not be configured for performing block-level encryption. However, changing data protection regulations may require some or all data within the elastic computing system to be encrypted. The aforementioned automatic unencrypted data replication would result in new volumes that do not comply with the regulations. Existing techniques for creating new copies of volumes from unencrypted snapshots of volume data may require the creation and subsequent deletion of a dedicated encryption resource for each new volume.

The aforementioned problems, among others, are addressed in some embodiments by the disclosed techniques for supporting default encryption for multiple new encrypted copies of an unencrypted snapshot. The disclosed encryption techniques use one or both of two intermediaries between the snapshot and the encrypted volumes for performing the encryption. For example, a first intermediary can be a read-only resource referred to herein as a "source volume," which represents an unencrypted block storage copy of the snapshot. The source volume can be created to handle target volume requests, or maintained for some period of time as a background resource for handling target volume requests. The servers storing this source volume can be provided with encryption keys for multiple targets, and can selectively apply the appropriate key to send correctly-encrypted data to each target.

Another intermediary can be a transform fleet that operates as part of a control plane of the computing system that hosts the snapshots and volumes. Because the object storage servers may not be able to perform block-level encryption, the transform fleet can act as an intermediary that fetches data from object storage, converts it into a block storage format, and applies the appropriate encryption. Similar to the source volume described above, the transform fleet can be provided with the encryption keys for multiple targets, and can selectively apply the appropriate key to send correctly-encrypted data to each target. Some implementations may use only the transform fleet as an intermediary, and the transform fleet can reach to one or both of the snapshot and source volume to obtain data for the target volume.

In one example, in the typical course of creating an encrypted target volume (or an unencrypted target volume), the blocks of the volume can be sent to the hardware configured to store the target volume in a predetermined order. For example, the source volume and a target volume may hydrate (e.g., wherein a volume is created from an object and/or another volume, which may include moving the snapshot and/or another volume from one storage location to another location, decompressing the snapshot, converting the snapshot from one format to another, etc.) in the same order as one another, such that the source volume hydration does not necessarily need to be completed before the target volume hydration can begin. This typical course (e.g., the predetermined pattern of copying blocks from source to target) may be altered under certain circumstances, such as when a "get-fault" occurs. A get-fault refers to a scenario in which a user or other client requests access to a block of data of a target volume, but that block has not yet been hydrated to the target. As such, that block can be dynamically fetched in response to the get-fault, even if this deviates from the predetermined block transmission order. In one example, during the typical course of creating the volume, blocks requested from the target can be retrieved from object storage and encrypted by an intermediary transform fleet that has access to multiple encryption keys corresponding to multiple targets. Get-fault requests can be handled by a read-only source volume copy of the snapshot that also has access to the multiple encryption keys. Alternative implementations can handle all block requests using just the source volume, or just the transform fleet. For example, some implementations can use just the transform fleet as the intermediary, and the transform fleet may reach to the snapshot for volume data during the typical course of creating the volume, and to the source volume to handle get-fault requests.

The disclosed technology beneficially provides a mechanism for encrypting a volume while minimizing exposure of the encryption information. For example, the transform fleet and/or source volume can store encryption keys (in encrypted and/or decrypted form) in a trusted platform module ("TPM"). Decryption of these keys may require authorization from a key management resource, such that the transform fleet and/or source volume may require configuration as an approved entity to receive the data key (e.g., the decrypted contents of the encryption key). Data keys may be stored in volatile memory such that they are erased upon reset of the hardware performing encryption. Further, the encryption keys can be stored in separate hardware from the hardware configured to store the target volumes.

As used herein, encryption context can refer to a set of key-value pairs used for encryption and decryption operations within the elastic computing system, and can also include a grant token on the encryption key and/or an encryption status flag, which in the disclosed techniques would be set to "encrypt" or potentially "transcode." Generally, encryption context refers to any value (e.g., a string of alphanumeric characters) that can be used to encrypt data. Although the encryption context is not included in an encrypted target volume, it is cryptographically bound to the encrypted volume during encryption and must be passed again when a user or the system calls for decryption or re-encryption. Decryption only succeeds if the encryption context passed for decryption is exactly the same as the encryption context used during encryption. The intermediaries used to create encrypted volumes and any volume data stored thereon can be hidden from the end user, meaning for example that users cannot perform reads and writes to data stored at these intermediaries, and/or that users are not otherwise made aware of the existence of volume data stored at the intermediaries. Beneficially, the use of such intermediary hardware avoids storing the key and the encrypted data on the same computer hardware.

As would be appreciated by one of skill in the art, the use of flexible intermediary hardware to enable encryption, as disclosed herein, represents a significant technological advance over prior implementations. Specifically, the disclosed techniques result in compliance with data protection regulations without pushing any additional burden to users to encrypt their own data. For example, when using an intermediary to perform encryption as described herein, the intermediary can be assigned an authorized identify to use an encryption key of the user, thereby enabling the intermediary assume the identity of the user for encryption purposes without creating any additional burden for the user. Further, the use of a dedicated intermediary hardware for performing encryption both isolates the encryption context from the hardware used to store the encrypted volume, and also mitigates any impact on user reads and writes to the primary copy of the volume, as the primary copy is not involved in any data transfer for the encryption process. Additionally, the tandem usage of the disclosed source volume and transform fleet can enable certain block requests to reach back to object storage, beneficially reducing the load on the source volume pool that is available for a particular snapshot, while still allowing for block-level data encryption. The transform fleet can also address the challenge of creating block-level encrypted volumes from unencrypted source(s) without requiring a full intermediary volume. As well, the storage of multiple encryption contexts as described herein allows a single source volume and/or single entity of the transform fleet to perform parallel encryption of multiple target volumes that each may have a different encryption context. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, although the encryption techniques are described with respect to encryption, they can also be used for transcoding where the type of encryption changes between the source data and the encrypted data. Further, although the disclosed techniques are at times described with respect to parallel creation of multiple encrypted volumes, they can equally be applied to creation of multiple unencrypted volumes in parallel, or the creation of encrypted and unencrypted volumes in parallel. In addition, although described in the context of an elastic computing system, the disclosed encryption-by-default techniques can be implemented in other suitable data-hosting networked computing environments.

Overview of Example Computing Environment with Tertiary Replica

FIG. 1A depicts an example computing environment 100 including an elastic computing system 120 in which the disclosed encryption-by-default can be implemented. The elastic computing system 120 can be accessed by user devices 130 over a network 125. The elastic computing system 120 includes one or more object storage servers 110, one or more block store servers 105, one or more control plane servers 112, and one or more intermediary servers 115 that are in networked communication with one another and with the network 125 to provide users with on-demand access to computing resources including snapshots 111 and target volumes 118, among others. These particular resources are described in further detail below. Some implementations of elastic computing system 120 can additionally include elastic compute servers providing computing resources (referred to as "instances"), domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The elastic computing system 120 can provide on-demand, scalable computing platforms to users through the network 125, for example allowing users to have at their disposal scalable instances, such as "virtual computing devices" via their use of the object storage servers 110 and block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). Users can connect to their virtual computing device using a secure shell (SSH) application, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 125. In an example embodiment, a region can include two or more availability zones each backed by one or more physical data centers provided with redundant and separate power, networking and connectivity to reduce the likelihood of two zones failing simultaneously. While a single availability zone can span multiple data centers, in an embodiment, no two availability zones share a data center. This can protect users from data-center level failures. A data center refers to a physical building or enclosure that houses and provides power and cooling to one or more of the intermediary servers 115, object storage servers 110, control plane servers 112, and block store servers 105. In an embodiment where the service provider uses availability zones, data centers within an availability zone and the availability zones within a region can be connected to one another through private, low-latency links, for example fiber optic network cables. This compartmentalization and geographic distribution of computing hardware enables the elastic computing system 120 to provide fast service to users on a global scale with a high degree of fault tolerance and stability. To distribute resources evenly across the zones in a given region, the provider of the elastic computing system 120 may independently map availability zones to identifiers for each user account.

The elastic computing system 120 can communicate over network 125 with user devices 130. The network 125 can include any appropriate network, including an intranet, the Internet, a cellular network, a local area network or any other such network or combination thereof. In the illustrated embodiment, the network 125 is the Internet. Protocols and components for communicating via the Internet or any of the other aforementioned types of communication networks are known to those skilled in the art of computer communications and thus, need not be described in more detail herein.

User computing devices 130 can include any network-equipped computing device, for example desktop computers, laptops, smartphones, tablets, e-readers, gaming consoles, and the like. Users can access the elastic computing system 120 via their computing devices 130, over the network 125, to view or manage their data and computing resources, as well as to use websites and/or applications hosted by the elastic computing system 120.

Turning specifically to the roles of the different servers within the elastic computing system 120, the block store servers 105 provide persistent data storage in the form of volumes. The block store servers 105 include one or more servers on which data is stored in as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. The block store servers 105 are configured to mirror the content of block devices between servers 105 and synchronously replicate data across redundant servers. For example, the block store servers 105 can have built-in redundancy for volumes by replicating the volume across multiple servers within an availability zone (e.g., a primary replica and a synchronous secondary replica), which means that volumes will not fail if an individual drive fails or some other single failure occurs. The primary and secondary replicas can support user reads and writes (input/output operations, or "I/O operations"), and thus the block store servers 105 can be accessible to the user computing devices 130 over the network 125.

User volumes, which can be treated as an individual hard drive ranging for example from 1 GB to 1 terabyte TB in size, are made of one or more blocks stored on the block store servers 105. Although treated as an individual hard drive, it will be appreciated that the hardware storing a volume may not actually be a hard drive, but instead may be one or more virtualized devices implemented on one or more underlying physical host devices. Volumes may be partitioned a number of times (e.g., up to 16) with each partition hosted by a device of the elastic computing system 120. In FIG. 1A, these volumes are shown as source volumes 116 and target volumes 118. The block store servers 105 can store other types of volumes, for example original user volumes of data.

The target volumes 118 can be encrypted from unencrypted snapshots as described herein, for example by using a particular source volume 116 and/or the transform fleet 160 as an intermediary. Some of the target volumes 118 stored on the block store servers 105 may be encrypted through other techniques, or may be unencrypted. Generally, a target volume 118 refers to a block store volume, the data of which has been copied from another resource of the elastic computing system 120, and that is available to handle user reads and writes. Target volumes will typically follow the partitioning of the origin volume from which their data is copied.

A source volume 116 refers to a block store volume, the data of which has been copied from another resource of the elastic computing system 120, and that is not available to handle user reads and writes. These source volumes 116 can be created dynamically in response to new target volume requests, re-used after an initial target volume hydration for later target volume hydrations, or pre-created as an available resource for hydration of new target volumes. In some implementations, some source volumes may be highly partitioned (e.g., up to a thousand times or more, potentially up to one partition per block). For instance, for fault tolerance and data redundancy, volumes can typically be stored in block storage as a primary and secondary replica that share the same partitioning structure and update synchronously with one another. The elastic computing environment 120 can create additional, highly partitioned replicas of the volume. The highly partitioned replica can be stored using a containerized database structure in some implementations, with different partitions stored on different computer hardware from one another (though in some scenarios a certain number of the partitions may be stored in the same container). This can, for example, speed up hydration by using the highly partitioned replica as a source instead of the primary or secondary replicas as the source, which also beneficially frees up the primary and secondary replicas for handling user I/O operations. Various implementations may update the highly partitioned replica synchronously or asynchronously with the primary and secondary replicas, or may maintain the highly partitioned replica as a point-in-time copy of the primary and secondary replicas.

The object storage servers 110 represent another type of storage within the elastic computing environment 120. The object storage servers 110 include one or more servers on which data is stored as objects within resources referred to as buckets. For example, a snapshot 111 of a volume can be stored in a bucket of a particular user. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, so authorized access to them can be obtained through requests from networked computing devices in any location. Each bucket is associated with a given user account. Users can store as many objects as desired within their buckets, can write, read, and delete objects in their buckets, and can control access to their buckets and the contained objects. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of object storage's vast scalability and metadata characteristics.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the volumes described above, they can also be used to provide data backup as described below with respect to snapshots (e.g., object-stored backups of volume data).

Users can instruct the elastic computing system 120 to create snapshots of their volumes stored on the block store servers 105. When a volume is unencrypted, typically any snapshot of that volume would be unencrypted as well. A snapshot can then be used to create a new volume with information matching the volume captured in the snapshot, for example providing the benefit of feeding the volume data to the new copy without impacting I/O operations at the primary and secondary replicas of the volume. Further, due to the greater redundancy of the object storage servers 110 provided in some embodiments, such snapshots may provide a more resilient backup copy of a volume than additional copies stored on the block store servers 105. Another benefit of using a snapshot to create a new volume copy is that it may provide the ability to replicate the volume across availability zones, while the block store servers 105 may only support replication within a given availability zone.

In one embodiment, a snapshot is a point-in-time block-level backup of the volume, stored as a copy of data on the volume on one or more of the object storage servers 110 (e.g., as a single object or a collection of objects). However, unlike other data stored on the object storage servers 110, snapshots may not be accessible within user buckets, and instead are accessible through the application programming interface ("API") of the block store servers 105. In one example, snapshots are implemented as incremental records of data within a volume. Illustratively, when the first snapshot of a volume is taken, all blocks of the volume that contain valid data are copied as one or more objects to the object storage servers 110, and then a snapshot "table of contents" or "manifest" file is written to the object storage servers 110 that includes a record of the one or more objects, as well as the blocks of the volume to which each of the one or more objects correspond. Due to the use of incremental snapshots, when the subsequent snapshots are taken of the same volume, only the blocks that have changed since the first snapshot need by copied to the object storage servers 110, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 110, and new copies of the instance can be launched from the machine image.

Different subsets of the block store servers 105 can store the source volumes 116 and the target volumes 118, such that the hardware hosting the source volumes 116 can be positioned within the elastic computing system 120 as an intermediary between the object storage servers 110 and the block store servers 105 configured for hosting target volumes. In addition, the subset of the block store servers 105 that store source volumes 116 can also store encryption contexts for encrypting these source volumes 116 into particular encrypted target volumes 118. In some implementations, the source volume subset of the block store servers 105 can be in data communication with the object storage servers 110 and the remaining block store servers 105, but may not be accessible to the user computing devices 130. Similarly, the intermediary servers 115 that host the transform fleet 160 can be positioned within the elastic computing system 120 as an intermediary between the object storage servers 110 and the block store servers 105 configured for hosting target volumes, and may not be accessible to the user computing devices 130. For example, the intermediary servers 115 may be configured not to accept connection requests from clients, such as clients that handle user I/O operations.

The control plane servers 112 may also be configured not to accept connection requests from clients, as it hosts the control plane 155. The control plane 155 is a logical construct that can be implemented by at least one server 112 with computer-executable software for coordinating system and user requests and propagating them to the appropriate servers in the elastic computing system 120. Functions of the control plane 155 can include, for example, replication of data, failover operations, and receiving requests from users for specific actions to be performed with respect to their hosted virtual computing devices. These can include creating, cloning, and snapshotting volumes 106.

Figure 1B:
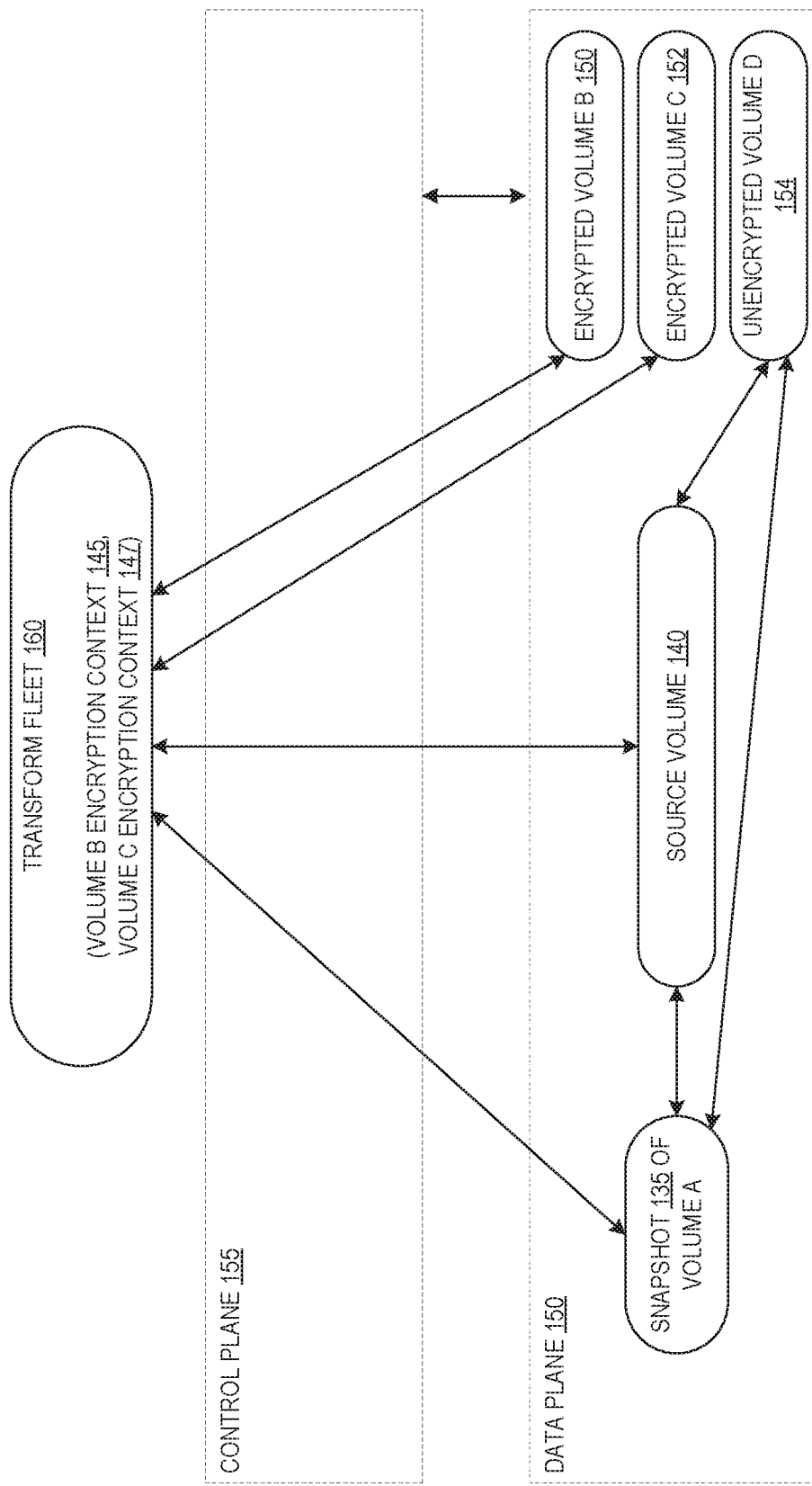
FIG. 1B depicts a schematic diagram of replicated data instances for creating encrypted and unencrypted volumes within the elastic computing system of FIG. 1A, according to the present disclosure.

FIG. 1B depicts an example of how the object storage servers 110, intermediary servers 115, control plane servers 112, and block store servers 105 can be configured to replicate encrypted and unencrypted data, according to embodiments of the present disclosure. FIG. 1B also depicts a data plane 150 and the control plane 155 of the elastic computing system 120. The data plane 150 represents the movement of user data through the elastic computing system 120, while the control plane 155 represents the movement of control signals through the elastic computing system 120. The data plane 150 in the illustrated embodiment is implemented by execution of operations on the unencrypted snapshot 135, source volume 140, and target volumes 150, 152, 154. One skilled in the art will appreciate that the data plane 150 and control plane 155 represent logical constructs related to the operation of the servers 105, 110, 115, rather than a physical configuration of the servers.

As described above, the object storage servers 110 can store an unencrypted snapshot of a particular origin volume, here denoted as "volume A." This is represented in FIG. 1B as the unencrypted snapshot 135 of volume A. When the user requests to create a new volume copying the state of volume A as reflected in the snapshot, the control plane 155 can coordinate providing the data of volume A from either the unencrypted snapshot 135 of the object storage servers 110 or the source volume 140 to the block store servers 105. This can be performed multiple times, in succession and/or in parallel, to create the example encrypted volume B 150, encrypted volume C 152, and unencrypted volume D 154. Volumes 150, 152, and 154 are thus "target volumes." For example, the transform fleet 160 can handle the data encryption and retrieval for the encrypted volume B 150 and encrypted volume C 152, while the unencrypted volume D 154 may communicate directly (e.g., without the use of the intermediary transform fleet 160) with the source volume 140.

As described herein, the path from the snapshot 135 to the encrypted target volumes 150, 152 can involve the transform fleet 160 as an intermediary that draws from one or both of the snapshot 135 and source volume 140 to provide the data of volume A to the target volumes 150, 152, 154. For example, the control plane 155 can create a new volume or access an existing block storage copy of the snapshot 135, referred to as source volume 140 as it can be a source of the eventual target volumes 150, 152, and 154. The source volume 140 can be a read-only resource that is stored on a particular subset of the block store servers 105 that is not accessible to users, as this subset may also be used to store encryption contexts in some implementations (although the illustrated example only stores the encryption contexts at the transform fleet 160). Here, the set of servers storing the transform fleet 160 can be provided with volume B's encryption context 145 and volume C's encryption context 147, in order to support the encrypted hydration of each of these new target volumes. As described above, the encryption context can be a key-value pair usable for encrypting the data and again for decrypting the encrypted data. The encryption contexts may involve storage of encrypted versions of encryption keys, for example in a TPM or other suitable secured storage, with unencrypted versions securely maintained by a key manager that only permits access to authorized entities. A TPM is a specialized chip that stores encryption keys and an n international standard for a secure cryptoprocessor. As described above, the encryption context can be a key-value pair usable for encrypting the data and again for decrypting the encrypted data.

The transform fleet 160 can also create a transform instance (e.g., a processing resource within the system 120) for each target that it will hydrate. The transform instance can receive block requests from the corresponding encrypted target volume, and can select which of the snapshot 135 or source volume 140 to draw upon for the data of the particular requested block, for example based on the type of block request. The servers storing the transform fleet 160 can be configured to adaptively identify which target volume is requesting a particular block of data and apply the appropriate encryption on that block. After encryption on the servers storing the transform fleet 160, the encrypted data of volume A is sent to additional subsets of the block store servers 105 as the encrypted volume B 150 and encrypted volume C 152, which represent encrypted copies of volume A. In other scenarios, the blocks of the source volume 140 can be copied without encryption, for example to unencrypted volume D 154. Each of these target volumes may be stored on its own subset of the block store servers 105, and such subsets can be available for handling user I/O.

The transform fleet 160 can receive object formatted data from the object storage servers, convert it into block format, apply the appropriate encryption, and send it to the appropriate target volume. Beneficially, this enables the encryption of data originating from snapshot 135 while bypassing the source volume 140, for example if the source volume 140 is unavailable or if the data transmission of the source volume 140 is being used above a threshold. Some previous solutions created a source volume 140 for each target, however with the disclosed approach the same source can support multiple paths for encryption. For example, the source volume 140 may directly hydrate the unencrypted volume D, while providing the data of volume A to the encrypted volumes B or C through the transform fleet 160.

In some implementations, only the transform fleet 150 may operate as an intermediary between the snapshot and the target volumes. Other embodiments may employ the source volume as an additional intermediary in some scenarios. For example, the encrypted targets may reach directly to the snapshot 135 or source volume 140 based on the type of block request, with the transform fleet 160 operating to encrypt data sent from the snapshot 135 to the target. The source volume 140 may be able to perform encryption in implementations where the servers hosting the source volumes 140 are not multi-tenant, that is, the servers do not accept connection requests from multiple clients. Each of the source volume 140 and transform fleet 160 provides certain benefits when acting as an intermediary in the target volume hydration process. For example, the transform fleet 160 allows data to be securely encrypted in transfer from the snapshot 135 to a particular target 150, 152, without the need for using or creating an additional entire block store copy of volume A. However, the use of a dedicated block store resource for volume creation (such as the source volume 140) can result in a significant reduction in the amount of time required to create a new volume. Further, each data source can involve a different network path, as described below.

As described herein, hydrating target volumes from source volumes (directly or via an intermediary transform fleet) can result in significantly faster hydration compared to using a snapshot to directly hydrate the target volumes. For example, communications between the object storage servers 110 and the block store servers 105 can be passed through intermediary hardware such as a computing resource server that hosts processing instances, as described above. An example network path for establishing data transfer between the object storage servers 110 and the block store servers 105 can be as follows. A first computing instance can receive a request from a particular object storage server 110 to transfer data to a particular block store server 105. This first computing instance then sends the request along the computing instance network to a second computing instance. This second computing instance then sends the request to the particular block store server 105. As such, the network path can involve multiple hardware entities (the particular object storage server 110, the particular block store server 105, and the computing resource servers that host the first and second instances). In addition, the network connections between some or all of these hardware entities may use publicly accessible networks such as the Internet, as described above for purposes of fault isolation and redundant data concerns.

In contrast, communications between the block store servers 105 can be governed by an elastic volume hydration protocol in which the hardware of the target volume directly requests blocks of data from the hardware of the source volumes. Compared to the server 110 to server 105 network path described above, the server 105 to server 105 network path involves fewer communications between fewer distinct hardware entities within the elastic computing system 120, which can contribute to the faster hydration time. In addition, as described above the block store servers 105 can be connected to one another through private, low-latency links, for example fiber optic network cables. This can also contribute to the faster hydration time, in comparison to directly hydrating from the object storage servers 110.

As an example, a volume of 1 terabyte (TB) of data can take hours to create directly from a snapshot, however using the disclosed techniques the creation time is reduced to around 30 minutes. This increased speed for creating the new volumes also reduces the chance of a get-fault and its associated latencies, where a get-fault occurs when a user of the new volume requests to use a block of data from their new volume before it has been copied into the new volume. In get-fault scenarios, it can be beneficial to provide blocks of data to users with as little latency as possible, for example such that the user does not become aware that their requested block was not already in their target volume. However, when large numbers of users are requesting copies of the particular snapshot 135, the source volume 140 or even a pool of such volumes may become overwhelmed by demand, resulting in delayed responses from the source volume 140. Accordingly, reaching back to the snapshot 135 for certain less block requests that are less urgent than a get-fault can beneficially free up some availability of the source volume 140. Thus, the described dynamic intermediary selection for creation of target volumes balances the need for rapid block provision and source volume availability.

Overview of Example Target Volume Creation Techniques

Figure 2:
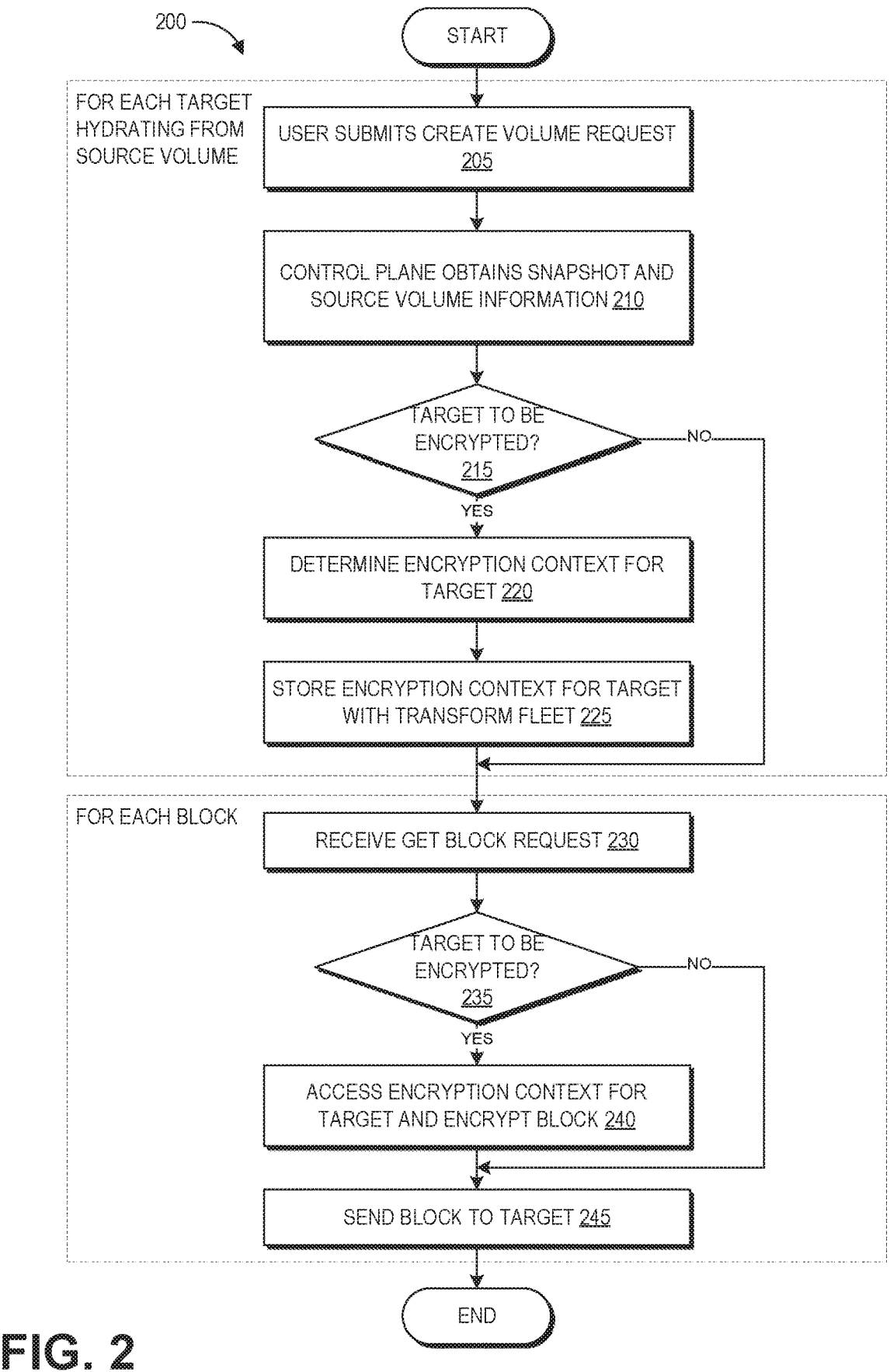
FIG. 2 is a flowchart of an example process for creating the encrypted and unencrypted volumes of FIG. 1B.

FIG. 2 is a flowchart of an example process 200 for creating the encrypted and unencrypted volumes of FIG. 1B. The process 200 can be performed under control of the control plane 155 of the elastic computing system 120 in some embodiments.

At block 205, a user submits a create volume request to the control plane 155, where the create volume request indicates that they would like to make a new volume copy of the data of a particular snapshot. For example, the operator of the elastic computing system 120 can run a web server that exposes one or more application program interfaces (APIs) to a network, such as the Internet. An API can be associated with one or more uniform resource locators (URLs) for different operations the API can perform. In this example embodiment, the operator can expose a URL for creation of volumes from snapshots that can take input parameters such as an identifier of the user, an identifier of the snapshot, or similar parameters. A user may create a new volume, for example, when the volume includes data and they want to run a number of different tests on the data simultaneously. As another example, a user may create a new volume when they need to run a new computing instance within the elastic computing system 120, where each computing instance has attached thereto one volume providing persistent storage for the computing instance. As another example, some users may make their snapshots available for other users within the elastic computing system 120, and other users can request to make new volume copies of these available snapshots.

At block 210, the control plane 155 obtains snapshot information, either from the object storage servers 110 or a service that hosts metadata of snapshots on the object storage servers. As described above, this snapshot information includes data that enables the control plane 155 to ascertain the encryption status of the snapshot and the encryption state on the volume, such that the control plane 155 can initiate the appropriate one of a number of create volume subroutines. Also at block 210, the control plane 155 can obtain information about a source volume that has been created from the snapshot, or can create a source volume from the snapshot. For example, some users can choose to accelerate hydration from their snapshots via a dedicated acceleration pool of source volumes, and the control plane 155 can identify one of these acceleration source volumes to use for a given hydration (e.g., based on optimizing one or more of various hydration goals including speed, network usage, and reliability). Both the snapshot and the source volume many be unencrypted.

At decision block 215, the control plane 155 determines whether the target volume is to be encrypted, and may additionally determine the encryption state of the snapshot and/or source volume. If the target volume is to be encrypted, the control plane 155 at block 220 can determine the encryption context for the target volume. For example, if a user account has specified a master key (referred to as a "customer master key" or CMK), the control plane 155 can use the CMK as the master key to generate a data key, otherwise the control plane 155 can assign a master key. The plaintext key used to perform encryption is referred to herein as the "data key," which can be encrypted using another key such as the CMK to increase security of the data key. Key assignment and management may be handled by a key manager as described herein.

At block 225, the control plane 155 can store the encryption context for the target with the transform fleet 160 (and optionally, also the source volume 140 in some embodiments). The encryption context stored at the transform fleet 160 (and optionally source volume 140) can include an encrypted version of the encryption key, as well as a grant for decryption of the key from the key manager, as described herein.

As illustrated, blocks 205-225 can be repeated for each target volume that is assigned to hydrate from the same source volume. Thus, the transform fleet 160 (and optionally source volume 140) can store the encryption contexts of multiple different target volumes. It will be appreciated that the CMK or assigned master key for each target volume may differ, and the grant needed to obtain access to a data key from the key manager can also differ for each target volume.

After block 225, or if the target is not to be encrypted at block 215, the process 200 transitions to block 230 where a "get block" request is received. As described above, volumes can be stored as blocks of data, and hydration of a new volume may follow a predetermined pattern of blocks (subject to certain exceptions, such as get-faults). In some implementations, the target volumes may drive hydration by requesting blocks from the snapshot 135 and/or source volume 140. This can enable a single source volume to support multiple, parallel hydrations. In other implementations the transform fleet 160 can be configured to generate the block requests. As described further below, under control of the transform fleet 160, some get block requests may obtain data from the source volume 140 while other get block requests may obtain data from the snapshot 135, in some implementations.

After receipt of the get block request, the transform fleet 160 can determine whether the particular target from which the get block request originated is to be encrypted. If so, the transform fleet 160 can access the appropriate encryption context for that target and can use it to encrypt the block. If not, or after block encryption, the process 200 proceeds to block 245 to send the requested block to the target.

As illustrated, blocks 230-245 can be repeated for each requested block from each target volume. Once each target volume has received all blocks of the volume, the process 200 terminates. Upon termination, the source volume 140 may be deleted in some embodiments, or may be maintained in other embodiments to support future target volume requests.

Figure 3:
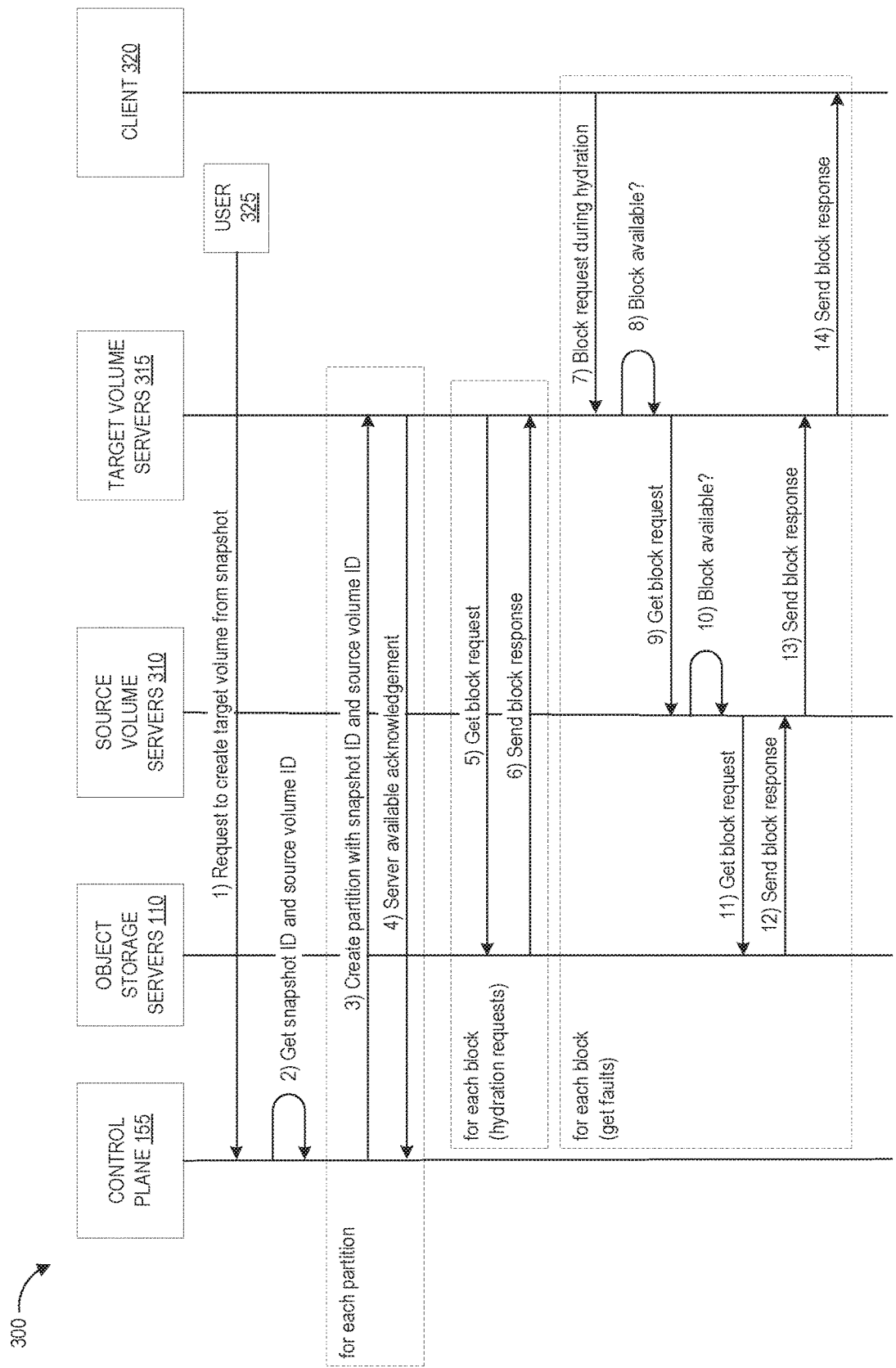
FIG. 3 depicts a schematic diagram of a first workflow for creating an unencrypted volume within the elastic computing system of FIG. 1A.

FIG. 3 depicts a schematic diagram of a first workflow for creating an unencrypted volume within the elastic computing system of FIG. 1A. FIG. 3 depicts data communications between the client 320, control plane 155, object storage servers 110, source volume servers 310, and target volume servers 315. The source volume servers 310 and target volume servers 315 can be different subsets of the block store servers 105, with the particular number of servers in each subset corresponding to the number of partitions of the volume in some implementations. The client 320 can represent the software that performs reads and writes to a block store to transform it into a virtual hard drive for a user or processing instance. The workflow 300 illustrates how hydration requests, e.g. block requests received according to the typical pattern of block hydrations, may be handled by the object storage servers 110. The workflow 300 also illustrates how get-fault requests may be handled by the source volume servers 310.

With continued reference to FIG. 3, illustrative interactions 300 are depicted for creation of an unencrypted volume from an unencrypted snapshot and/or unencrypted source volume. It will be appreciated that the interactions 300 can be repeated for each unencrypted target to hydrate from this source volume, and these multiple instances of the interactions 300 may be interleaved to support parallel hydration. The interactions of FIG. 3 begin at (1), where a user 325 submits a create volume request to the control plane 155. In response to the request, at (2) the control plane 155 obtains the snapshot ID and source volume ID that will be used in the hydration process. For example, the control plane 155 can select from among a pool of source volumes based on its network distance to the target volume, current bandwidth usage (e.g., number and type of target volumes currently hydrating from that source volume), and history of successful or unsuccessful hydrations, to name a few factors. Further, the control plane 155 may query the object storage servers 110 for snapshot information can including a manifest file that specifies the physical storage locations of different portions of the snapshot corresponding to different blocks of the volume.

Next, at interactions (3) and (4) the control plane 155 configures the hardware of one or more block store servers 105 for the target volume (depicted as the target volume servers 315). As illustrated by the dashed box labeled "for each partition," interactions (3) and (4) are performed for each partition of the volume, iteratively or in parallel. As described above, volumes may be partitioned a number of times, for example up to 16. At (3), the control plane 155 creates the partition on one of the target volume servers 315. This partition stores the source volume ID corresponding to the partition, as well as the snapshot ID. At (4), the block store server 105 sends a server available acknowledgement back to the control plane 155 to indicate that it has successfully stored the source volume ID and snapshot ID.

After sending the snapshot ID and source volume ID to the target volume servers 315, the control plane 155 initiates target volume hydration, which involves the remaining interactions (5) through (14). As illustrated by the dashed box labeled "for each block," interactions (5) and (6), or (7)-(14), are performed for each block of the volume, iteratively or in parallel. When the target volume server 315 is asked to create the target volume, it can be told to fetch data from the source volume server 310 and/or object storage servers 110.

In this example, interactions (5) and (6) correspond to get block requests during the predetermined pattern of block hydrations. Thus, at (5) the target volume server 315 sends a get block request to the object storage servers 110, and at (6) the object storage servers 110 responds with a send block response that provides the target volume server 315 with the data of the requested block. In other implementations, block requests during the predetermined pattern of block hydrations may instead reach to the source volume servers 310. As illustrated by the dashed box labeled "for each block (hydration requests)," interactions (5) through (6) are performed for each block of the volume requested during the predetermined order of block hydration, iteratively or in parallel.

In this example, interactions (7) through (14) correspond to get block requests that occur in response to a get-fault. Thus, interactions (7) through (14) may only occur if the client 320 requests a block of the target volume during hydration, and as described below only some of interactions (7) through (14) may occur in response to the block request. As illustrated by the dashed box labeled "for each block (get faults)," interactions (7) through (14) are performed for each block of the volume requested after a get-fault, iteratively or in parallel.

At (7), the client 320 submits a block request while the target volume is still hydrating from the source volume. For example, the user of the target volume may interact with the target volume in some way (e.g., reading or writing data) that requires the particular block of data. In response, at (8) the target volume servers 315 can check whether that particular block is available. If so, the target volume servers 315 can skip to interaction (14) to send the requested block to the client 320.

However, if the requested block is not available, this can trigger a get fault. In response to a get-fault, the target volume servers 315 may reach to the source volume servers 310 for block data instead of the object storage servers 110. As described above, the network path and communication protocols between block store servers can enable more rapid transfer of data to the target volume from the source volume, when compared to transfer from the snapshot to the source volume. Thus, for time-sensitive block requests such as get-faults, the target volume servers 315 may request data from the source volume servers 310.

In response to the get fault, at (9) the target volume servers 315 send a get block request to the source volume servers 310 in order to fetch the block from the source volume servers 310. For example, the particular target volume server 315 hosting the partition that includes the block can reach to the particular source volume server 310 for which it was provided an ID. As described above, the interactions 300 can occur while the source volume is still in the process of hydration from the snapshot. As such, the source volume may have a flag or other data indication that can be set to indicate whether or not the source volume has completed its hydration. If the source volume has completed hydration, the source volume server 310 can skip to interaction (13) to send the block to the target volume server 315, which in turn implements (4) to send the requested block to the client 420.

If the source volume has not completed hydration, at (10) the source volume server 310 can check whether that particular block is available. If so, the source volume server 310 can implement (13) to send the block to the target volume server 315, which in turn implement (14) to send the requested block to the client 320, similar to the interactions that occur when the source volume is fully hydrated but with the addition of the checking step. However, if the block is not yet available in the source volume, this can trigger an additional get-fault (e.g., a "double get-fault scenario"). In response to the additional get-fault, at (11) the source volume server 310 can send a get block request to the object storage servers 110 to fetch the block from the source snapshot. At (12) the object storage servers 110 send the data of the requested block the source volume server 310, which in turn implements (13) to send the block to the target volume server 315, which in turn implements (14) to send the requested block to the client 420. It will be appreciated that (12) can also involve the conversion of an object-storage representation of the data of the block into a block-storage representation of the data of the block.

Thus, as illustrated by interactions (7) through (14), because the source and target volumes can be hydrating in parallel, the target volume hydration process may encounter a "double get fault" scenario in which the client requests a block that is not available in either of the target or source volumes, necessitating a fetch of the data of that block from the object storage servers 110. Thus, in some scenarios the target volume hydration process can involve on-demand fetching certain requested blocks of data from the object storage servers, when such requested blocks are both requested by the client and not available in the source volume.

Figure 4A:
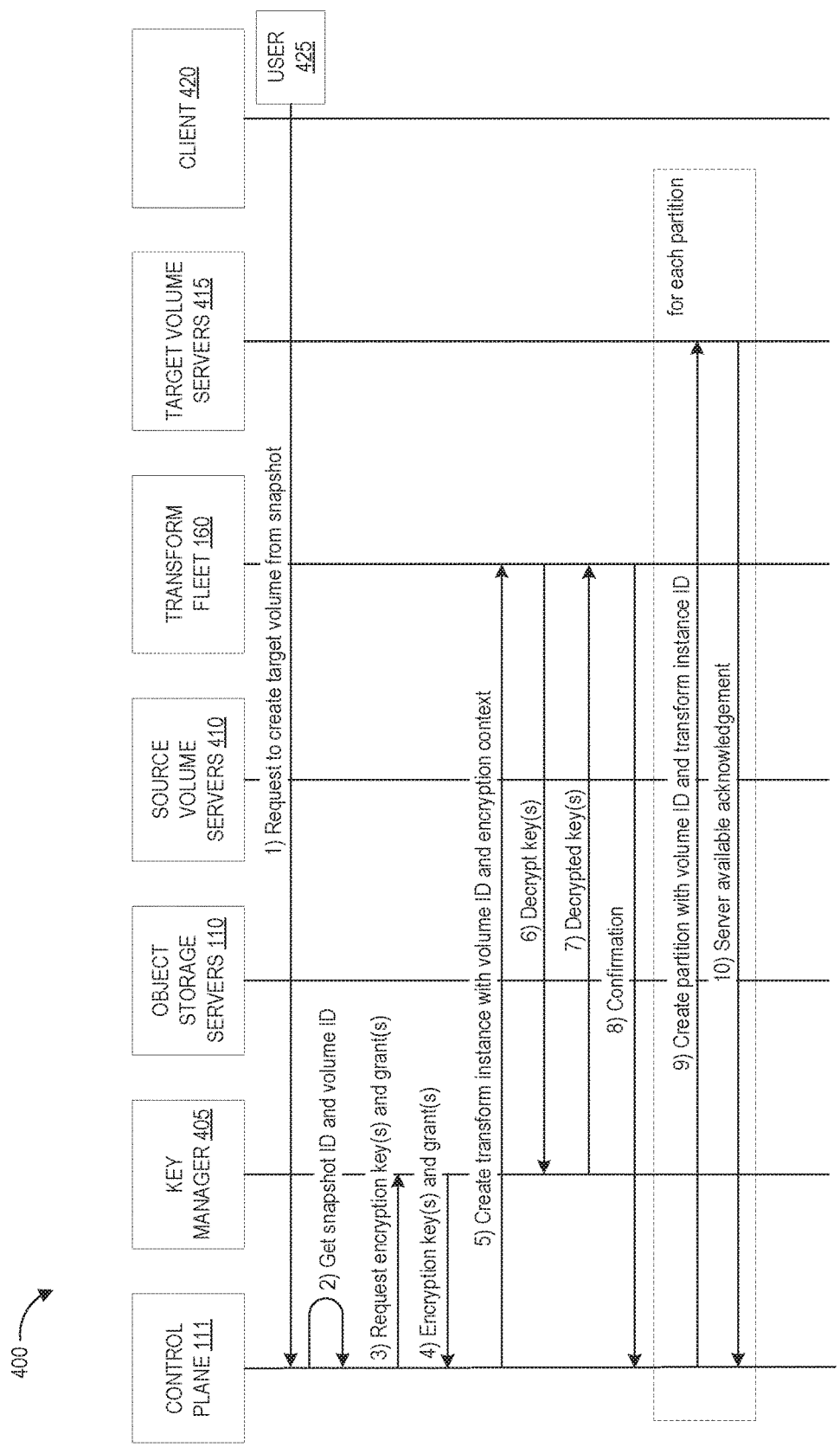
FIGS. 4A-4C collectively depict a schematic diagram of a second workflow for creating an encrypted volume within the elastic computing system of FIG. 1A.
Figure 4B:
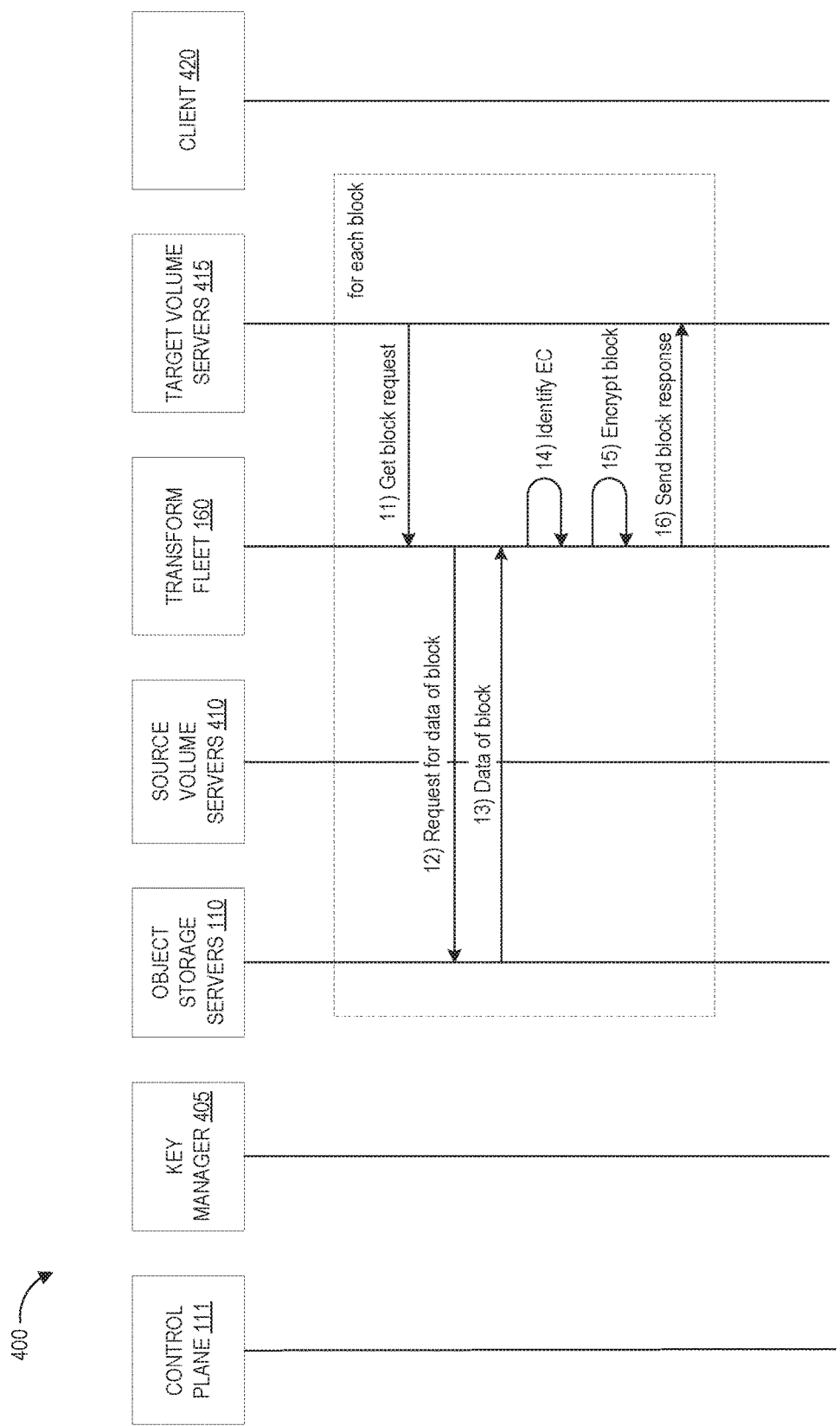
Figure 4C:
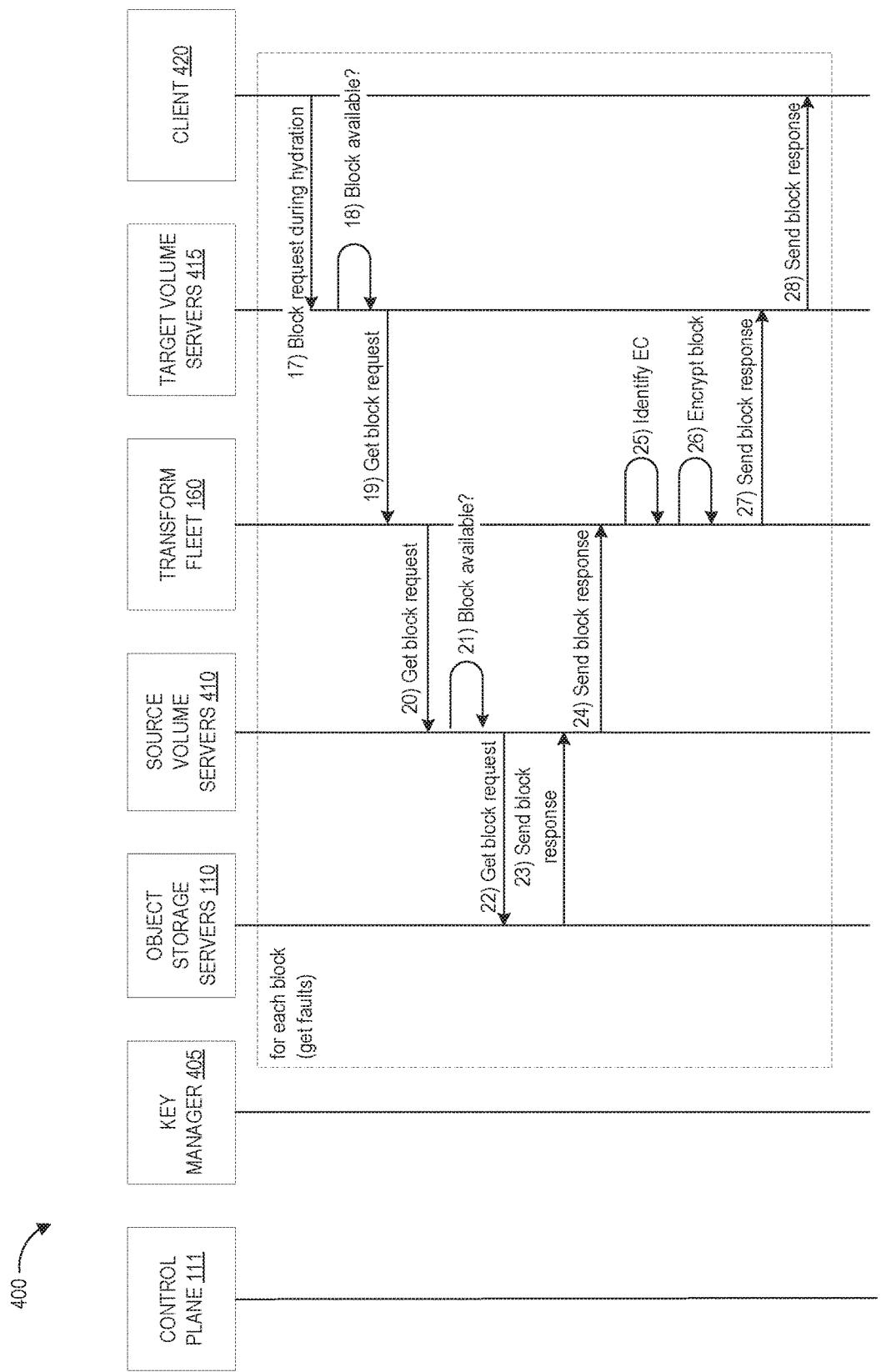

Turning now to FIGS. 4A-4C, these figures collectively depict a schematic diagram of a second workflow for creating an encrypted volume within the elastic computing system of FIG. 1A, where the encrypted volume is created from an unencrypted snapshot in a manner that limits security concerns and exposure of encryption information. Specifically, FIGS. 4A-4C depict data communications between the control plane 155, transform fleet 160, key manager 405, object storage servers 110, source volume servers 410, target volume server 415, and client 420 for a portion of the process used for encryption-by-default of new volumes. The source volume servers 410 and target volume servers 415 can be different subsets of the block store servers 105, with the particular number of servers in each subset corresponding to the number of partitions of the volume in some implementations. The client 420 can represent the software that performs reads and writes to a block store to transform it into a virtual hard drive for a user or processing instance. As described in more detail below, the source volume servers 410 are used to store the volume data received from object storage (as well as the encryption context, in some implementations). The target volume servers 415 are used to store the encrypted copy of the volume received from the transform fleet 160. In this implementation, the encrypted target is configured to reach to the transform fleet 160 with block requests, which in turn fetches data from either the object storage servers 110 or target volume servers 410, applies encryption, and returns encrypted blocks to the target. In other implementations, an encrypted target can reach directly to the object storage servers 110 or target volume servers 410 as described above for the unencrypted target workflow, with these servers in turn sending data to the transform fleet for encryption (or the target volume servers 410 may perform encryption locally).

As described above, the control plane 155 is a logical construct that can be implemented by at least one server 112 with computer-executable software for coordinating system and user requests and propagating them to the appropriate servers in the elastic computing system 120. The transform fleet 160 is a logical construct that handles encrypted new volume creation and can be implemented on internal servers of the elastic computing system 120 (e.g., servers that are not accessible to the user devices 130 but that are in data communication with the servers of the elastic computing system 120). The transform fleet 160 can be considered as part of the control plane 155, however it may be implemented on a distinct set of servers 115. The intermediary servers 115 of the transform fleet 160 can be configured not to accept connection requests from the client 420, in order to maintain security of the encryption keys stored on those servers.

The key manager 405 is also a logical construct that can be implemented on internal servers of the elastic computing system 120 in order to generate and manage cryptographic keys. For example, the key manager 405 can generate an encryption key based on master key or CMK, and then can allow authorized entities to obtain the encryption key. The key manager 405 manages assigning key-value pairs and grants for the encryption process. A key-value pair refers to a key identifier for an encrypted key, and serves as a validation mechanism for entities within the elastic computing system 120 trying to access the key. For example, a key-value pair of {"key name":"encryption by default key"} could be used to name the encryption key, and this name can be recorded when the key is used in order to track its usage. A grant is a token that enables a particular identity within the elastic computing system 120 to use a master key or CMK, or to gain access to the plaintext content of a key.

With reference initially to FIG. 4A, a first portion of illustrative interactions 400 are depicted for creation of an encrypted volume from an unencrypted snapshot and/or unencrypted source volume. It will be appreciated that the interactions 400 can be repeated for each encrypted target to hydrate from this source volume, and these multiple instances of the interactions 400 may be interleaved to support parallel hydration of multiple encrypted volumes. Further, the interactions 300 and 400 may be interleaved to support parallel hydration of encrypted and unencrypted volumes from the same source.

Generally, interactions (1) through (10) represent a setup phase for encrypted target creation. The interactions of FIG. 4A begin at (1), where the user 425 submits a create volume request to the control plane 155. While the control plane 155 may receive the initial request to create the new volume, in FIGS. 4A-4C, the transform fleet 160 performs additional functions beyond the control plane 155 in FIG. 3, where these additional functions relate to the encryption of data.

In response to the request, at (2) the control plane 155 obtains the snapshot ID and volume ID that will be used in the hydration process. For example, the transform fleet 160 can select a particular source volume that corresponds the snapshot (for pre-existing source volumes) or create a new source volume. As described above, a particular source volume can be selected from among a pool of source volumes based on its network distance to the target volume, current bandwidth usage (e.g., number and type of target volumes currently hydrating from that source volume), and history of successful or unsuccessful hydrations, to name a few factors. Further, the control plane 155 may query the object storage servers 110 for snapshot information can including a manifest file that specifies the physical storage locations of different portions of the snapshot corresponding to different blocks of the volume.

At (3) the control plane 155 sends a request to the key manager 405 to create an encryption key and grant for encrypting the target volume. Initially, the encryption key may be encrypted for heightened data security. A grant enables decryption of the encrypted key, and specifically enables the control plane 155 to programmatically delegate the use of encryption keys from the key manager 405 to other components of the elastic computing system 120, for example the transform fleet 160 (and optionally the source volume servers 410). Typically, a grant expires after one use. Accordingly, at (4) the key manager 405 returns an encrypted encryption key and grant to the control plane 155. In implementations where encryption can also occur on the source volume servers 410, they may also request and be provided with an encrypted encryption key and grant. The transform fleet 160 (and optionally source volume servers 410) persists this information for later use, for example by storing the encryption context in persistent memory such as a TPM. In this manner, even if the servers of the transform fleet 160 lose power (e.g., by rebooting), the encryption context remains accessible. The transform fleet 160 and source volume servers 410 can be set to disable I/O operations (e.g., these computing devices may not be configured to accept client connection requests), thus ensuring security of the encryption context.

At interaction (5), the control plane 111 instructs the transform fleet 160 to create a transform instance with the volume ID of the source and target volumes and with the encryption context. In response, at (6) the transform fleet 160 loads the encryption context and calls the key manager 405 to decrypt the encrypted encryption key. As described above, the key manager 405 can restrict access to keys to authorized/authenticated identities within the elastic computing system 120. Accordingly, the transform fleet 160 can be assigned an authenticated identity (e.g., by the control plane 111). This identity can assume a role on behalf of user requests to create encrypted volumes and further decrypt the data encryption key encrypted with the user's CMK. When the transform fleet 160 assumes a role, a temporary user (principal) can be created which is specific to the volume's context (i.e. the principal created during assuming role for volume1 will be different than the principal created while assuming role for volume2). This provides a validation such that the transform fleet 160 acting on behalf of a volume doesn't accidently mix-up data from different volumes. The grant token created by the key manager 405 can be for this identity, such that no other account can use this grant to access the key.

Based on the authorized identity of the transform fleet 160 server, the key manager 405 decrypts the encrypted encryption key and sends the unencrypted (plaintext) key (referred to as the "data key") back to the transform fleet 160 at (7). The transform fleet 160 can store the data key into memory for later use. For example, the transform fleet 160 can store the key in a volatile memory such as a non-persistent metadata cache in some implementations. As such, the data key will remain in memory while the transform fleet 160 server is powered on, but will be deleted when the server is powered off (e.g., during a periodic re-boot). Other implantations can use alternative storage strategies to ensure security. For example, the data key can be stored in a TPM, an encrypted software container, etc. This may be done for the target volume data key and the source volume data key in re-encryption implementations. Once the transform instance is created and configured with the key(s), the transform fleet 160 sends confirmation to the control plane 111 at interaction (8).

Next, at interactions (9) and (10) the control plane 155 configures the hardware of one or more block store servers 105 for storing the target volume (depicted as the target volume servers 415). As illustrated by the dashed box labeled "for each partition," interactions (9) and (10) are performed for each partition of the volume, iteratively or in parallel. As described above, volumes may be partitioned a number of times, for example up to 16. At (9), the control plane 155 creates the partition on one of the target volume servers 415. This partition stores the volume ID, as well as the ID of an instance of the transform fleet 160 that will handle this encryption. At (10), the target volume server 415 sends a server available acknowledgement back to the control plane 155 to indicate that it has successfully stored the required IDs.

Turning to FIG. 4B, the transform fleet 160 initiates encrypted target volume hydration, which involves the remaining interactions (11) through (28). As illustrated by the dashed box labeled "for each block," interactions (11) through (16), or (17) through (28), are performed for each block of the volume, iteratively or in parallel. When the target volume server 415 is asked to create the target volume, it can be told to fetch data from transform fleet 160.

In this example, interactions (11) through (16) correspond to get block requests during the predetermined pattern of block hydrations. In some implementations, at (11) the target volume server 415 sends a get block request to the transform fleet 160. The transform fleet 160 can identify which type of block request this is (e.g., during the typical order of hydration) and determine to reach to the object storage servers 110 for the data of this block. At (12), the transform fleet 160 requests the data for this block from the object storage servers 110, and at (13) the object storage servers return the requested information to the transform fleet 160. In some implementations, the object storage servers 110 may return additional data, for example where the block size is smaller than the minimum data transfer size for the object storage servers 110.

In response, at (14) the transform fleet 160 can identify the appropriate encryption context for the encryption of the requested block. As described herein, the transform fleet 160 may maintain the encryption contexts of multiple target volumes, and thus the transform fleet 160 may make a per-block determination as to which encryption context to use for encryption. The transform fleet 160 can implement an authentication protocol to confirm that the requesting entity is authorized to receive data encrypted by a particular data key. For example, the block request may include the target volume ID for the requesting volume, and the transform fleet 160 may authenticate this volume ID for a particular data key and access the data key. Further, the transform fleet 160 may run a separate computing instance to manage each encrypted hydration, and so the transform fleet 160 can call the particular instance that corresponds to the requesting target.

Thereafter, at (15) the transform fleet 160 uses the identified data key to encrypt the block, and at (16) the transform fleet 160 responds with a send block response that provides the target volume server 415 with the encrypted data of the requested block. As illustrated by the dashed box labeled "for each block (hydration requests)," interactions (11) through (16) are performed for each block of the volume requested according to the predetermined block order of hydration, iteratively or in parallel.

Turning now to FIG. 4C, another subset of the interactions 400 are depicted relating to block data transmission in response to get-faults. In this example, interactions (17) through (28) correspond to get block requests that occur in response to a get-fault. Thus, interactions (17) through (28) may only occur if the client 420 requests a block of the target volume during hydration, and as described below only some of interactions (17) through (28) may occur in response to the block request. As illustrated by the dashed box labeled "for each block (get faults)," interactions (17) through (28) are performed for each block of the volume requested after a get-fault, iteratively or in parallel.

At (17), the client 420 submits a block request while the target volume is still hydrating from the source volume. For example, the user of the target volume may interact with the target volume in some way (e.g., reading or writing data) that requires the particular block of data. In response, at (18) the target volume servers 415 can check whether that particular block is available. If so, the target volume servers 415 can skip to interaction (28) to send the requested block to the client 420.

However, if the requested block is not available, this can trigger a get fault. In response to a get-fault, the target volume servers 415 may reach to transform fleet 160 for the block data. In the get-fault scenario, at (20) the transform fleet 160 can send a get block request to the source volume servers 410 for block data instead of the object storage servers 110. As described above, the network path and communication protocols between block store servers can enable more rapid transfer of data to the target volume from the source volume, when compared to transfer from the snapshot to the source volume. Thus, for time-sensitive block requests such as get-faults, the transform fleet 160 may request data from the source volume servers 410.

As described above, the interactions 400 can occur while the source volume is still in the process of hydration from the snapshot. As such, the source volume may have a flag or other data indication that can be set to indicate whether or not the source volume has completed its hydration. If the source volume has completed hydration, the source volume server 410 can skip to interaction (25), described below.

If the source volume has not completed hydration, at (21) the source volume server 410 can check whether that particular block is available. If so, the source volume server 410 can skip to interaction (24), described below. However, if the block is not yet available in the source volume, this can trigger a double get-fault scenario. In response to the additional get-fault, at (22) the source volume server 410 can send a get block request to the object storage servers 110 to fetch the block from the source snapshot. At (23) the object storage servers 110 send the data of the requested block the source volume server 410. Thereafter, at (24) the source volume servers 410 can send the data of the block to the transform fleet 160.

At interaction (25) the transform fleet 160 can identify the appropriate encryption context for the encryption of the requested block, for example using an authentication protocol that verifies the volume ID as authorized to receive data encrypted via a particular key, as described above. Thereafter, at (26) the transform fleet 160 loads the data key into memory and uses the data key to encrypt the block, and at (27) the transform fleet 160 responds with a send block response that provides the target volume server 415 with the encrypted data of the requested block. At (28), the target volume servers 415 can send the requested block to the client 420.

Typically, data replication between block store servers may involve the source volume actively managing the blocks that are sent to a single, designated target volume. However, in order to allow the source volumes described herein to simultaneously hydrate multiple target volumes, the disclosed techniques can allow the target volume to manage the blocks that are requested as shown in the interactions 300, 400. However, though the depicted interactions of FIGS. 3-4C show target volume servers 315, 415 "pulling" data (e.g., actively sending get block requests), other implementations may instead "push" data from the source to the target volume servers 315, 415.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes 210, 255 may begin in response to an event, such as on a predetermined or dynamically determined schedule, on demand when initiated by a user or system administer, or in response to some other event. When the process 210, 255 is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process 210, 255 or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computing system comprising:
   a first set of servers configured to store a first encrypted block representation of a volume;
   a second set of servers configured to store a second encrypted block representation of the volume; and
   a control plane system including one or more processors coupled to one or more memories, the one or more memories including computer-executable instructions that, upon execution by the one or more processors, cause the control plane system to implement a transform fleet to:

receive a first request to create the first encrypted block representation of the volume from a snapshot of the volume and a second request to create the second encrypted block representation of the volume from the snapshot of the volume, create a first transform instance for creating the first encrypted block representation and create a second transform instance for creating the second encrypted block representation, receive a first encryption key to use for creating the first encrypted block representation and a second encryption key to use for creating the second encrypted block representation, store the first encryption key and the second encryption key in memory of the control plane, selectively use the first transform instance and the first encryption key to encrypt one or more blocks of the volume for transmission to the first set of servers, and selectively use the second transform instance and the second encryption key to encrypt one or more blocks of the volume for transmission to the second set of servers.

2. The computing system of claim 1, further comprising:

a third set of servers configured to store an unencrypted object storage representation of data of the volume; and a fourth set of servers configured to store a read-only source volume created from the unencrypted object storage representation as an unencrypted block representation of the volume;

wherein the one or more memories include further computer-executable instructions that, upon execution by the one or more processors, cause the control system to implement the transform fleet to access data of the volume from the third set of servers for a first type of request for one or more blocks of the volume, and to access data of the volume from the fourth set of servers for a second type of request for one or more blocks of the volume.

3. The computing system of claim 2, wherein the second type of request includes a get-fault request in which a user device accessing the first encrypted block representation of the volume or the second encrypted block representation of the volume, requests access to a block that has not yet been provided to the first encrypted block representation of the volume or the second encrypted block representation of the volume.

4. A computer-implemented method comprising:

receiving a first request to create an encrypted volume from a volume of data;

creating a transform instance in a transform fleet to create the encrypted volume, wherein creating the transform instance includes accessing a key for use in creating the encrypted volume;

receiving a second request to create an additional volume, wherein the encrypted volume comprises a block representation of the volume of data and the additional volume comprises an additional block representation of the volume of data;

accessing at least one source storing the volume of data in an unencrypted representation;

creating the encrypted volume at least in part by using the transform instance as an intermediary between the at least one source and the encrypted volume, wherein the transform instance creates the encrypted volume at least in part by using the key to encrypt the data of the volume accessed from the at least one source; and creating the additional volume from the data of the volume accessed from the at least one source, wherein creating the additional volume occurs at least partially in parallel with creating the encrypted volume.

5. The computer-implemented method of claim 4, wherein the additional volume comprises an additional encrypted volume, and wherein the computer-implemented method further comprises:

creating an additional transform instance in the transform fleet to create the additional encrypted volume, wherein creating the additional transform instance includes accessing an additional key for use in creating the additional encrypted volume; and creating the additional encrypted volume at least in part by using the additional transform instance as an intermediary between the at least one source and the additional encrypted volume, wherein the additional transform instance creates the additional encrypted volume at least in part by using the additional key to encrypt the data of the volume accessed from the at least one source.

6. The computer-implemented method of claim 5, further comprising, via the transform fleet:

receiving, from the encrypted volume, a first block request for a particular block of the volume of data;

accessing data of the particular block from the volume of data in the unencrypted representation stored by the at least one source;

identifying a first data key based on authorization of the encrypted volume as a sender of the first block request, wherein the first data key corresponds to decrypted contents of the key;

calling the transform instance to use the first data key to encrypt the particular block into a first encrypted block; and sending the first encrypted block to the encrypted volume.

7. The computer-implemented method of claim 6, further comprising, via the transform fleet:

receiving, from the additional encrypted volume, a second block request for the particular block;

accessing the data of the particular block from the volume of data in the unencrypted representation stored by the at least one source;

identifying a second data key based at least in part on authorization of the additional encrypted volume as a sender of the second block request, wherein the second data key corresponds to decrypted contents of the additional key;

calling the transform instance to use the second data key to encrypt the particular block into a second encrypted block; and sending the second encrypted block to the additional encrypted volume.

8. The computer-implemented method of claim 4, wherein the additional volume comprises an additional unencrypted volume, and wherein creating the additional volume comprises receiving the data of the volume in the unencrypted representation directly from the at least one source.

9. The computer-implemented method of claim 4, wherein the data of the volume in the unencrypted representation is stored by the at least one source in an unencrypted object representation and an unencrypted read-only block representation, and wherein the computer-implemented method further comprises, via the transform fleet:

accessing data from the unencrypted object representation for a first type of block request; and accessing data from the unencrypted read-only block representation for a second type of block request that is different from the first type of block request.

10. The computer-implemented method of claim 9, further comprising:
selecting the unencrypted read-only block representation in response to a get-fault request in which a client device accessing the encrypted volume requests access to a first particular block of the volume of the data that has not yet been provided to the encrypted volume; and
selecting the unencrypted object representation in response to a block request for a second particular block of the volume of the data.

11. The computer-implemented method of claim 9, further comprising:
providing the key to a memory of a computing device implementing the transform fleet;
accessing a particular block from a selected one of the unencrypted object representation and the unencrypted read-only block representation; and
encrypting the particular block at the computing device of the transform fleet using the key.

12. The computer-implemented method of claim 4, wherein using the transform instance to create the encrypted volume comprises receiving, at a computing device implementing the transform fleet, a data key from a key manager server, wherein the data key corresponds to decrypted contents of the key.

13. The computer-implemented method of claim 12, further comprising assigning the computing device implementing the transform fleet an authorized identity to receive the data key.

14. Non-transitory computer-readable media storing computer-executable instructions that, when executed on a computing system, cause the computing system to perform operations comprising:
receiving a first request to create an encrypted volume from a volume of data;
receiving a second request to create an additional volume, wherein the encrypted comprises a block representation of the volume of data and the additional volume comprises an additional block representation of the volume of data;
accessing an unencrypted source storing the volume of data;
calling a transform fleet to act as an intermediary between the encrypted volume and the unencrypted source, wherein the transform fleet fetches the data of the volume from the unencrypted source and uses an encryption key to encrypt the data that is fetched for the encrypted volume; and
creating the additional volume from the unencrypted source, wherein creating the additional volume occurs at least partially in parallel with creating the encrypted volume.

15. The non-transitory computer-readable media of claim 14, wherein the additional volume comprises an additional encrypted volume, and wherein the non-transitory computer-readable media stores further computer-executable instructions that, when executed on the computing system, cause the computing system to perform operations comprising:
identifying an additional encryption key to use in creating the additional encrypted volume; and
using the transform fleet as an intermediary between the unencrypted source, and the encrypted volume and the additional encrypted volume, wherein the transform fleet uses, based at least in part on an authentication protocol, an appropriate one of the encryption key and the additional encryption key to encrypt the data that is fetched for the encrypted volume and the additional encrypted volume.

16. The non-transitory computer-readable media of claim 14, the additional volume comprises an additional unencrypted volume, and wherein to create the additional volume from the volume of data, the non-transitory computer-readable media stores further computer-executable instructions that, when executed on the computing system, cause the computing system to perform operations comprising receiving the data of the volume directly from the unencrypted source.

17. The non-transitory computer-readable media of claim 14, wherein the non-transitory computer-readable media stores further computer-executable instructions that, when executed on the computing system, cause the computing system to perform operations comprising, via the transform fleet:
selecting an unencrypted block representation of the volume as a data source for a first type of block request; and
selecting an unencrypted object representation of the volume as the data source for a second type of block request that is different from the first type of block request.

18. The non-transitory computer-readable media of claim 17, wherein the non-transitory computer-readable media stores further computer-executable instructions that, when executed on the computing system, cause the computing system to perform operations comprising:
selecting the unencrypted block representation in response to a get-fault request in which a user device accessing the encrypted volume requests access to a first particular block of the volume that has not yet been provided to the encrypted volume; and
selecting the unencrypted object representation in response to a block request occurring as part of a sequence of block requests predetermined for creating the encrypted volume, the block request for a second particular block of the volume.

19. The non-transitory computer-readable media of claim 18, wherein the non-transitory computer-readable media stores further computer-executable instructions that, when executed on the computing system, cause the computing system to perform operations comprising, via the transform fleet:
accessing the first particular block from the unencrypted block representation of the volume;
accessing the second particular block from the object storage representation of the volume; and
encrypting the first particular block and the second particular block using the encryption key.

20. The non-transitory computer-readable media of claim 14, wherein the non-transitory computer-readable media stores further computer-executable instructions that, when executed on the computing system, cause the computing system to perform operations comprising assigning the transform fleet an authorized identity to receive a data key from a key manager, wherein the data key corresponds to decrypted contents of the encryption key.

* * * * *